US012645617B1

(12) United States Patent
Naghshineh et al.

(10) Patent No.: US 12,645,617 B1
(45) Date of Patent: Jun. 2, 2026

(54) DIGITAL PROCESSING UNIT (DPU) INCLUDING AN INTERCONNECTED NETWORK INTERFACE CONTROLLER (INIC) INTERFACE

(71) Applicant: Chelsio Communications, Inc., Sunnyvale, CA (US)

(72) Inventors: Kianoosh Naghshineh, Palo Alto, CA (US); Suneel Kumar Siddavatam, Bangalore (IN); Anirban Banerjee, Bangalore (IN)

(73) Assignee: Chelsio Communications, Inc., Sunnyvale, CA (US)

( * ) Notice: Subject to any disclaimer, the term of this patent is extended or adjusted under 35 U.S.C. 154(b) by 24 days.

(21) Appl. No.: 18/944,578

(22) Filed: Nov. 12, 2024

(51) Int. Cl.
*G06F 13/16* (2006.01)

(52) U.S. Cl.
CPC ................................ *G06F 13/1684* (2013.01)

(58) Field of Classification Search
None
See application file for complete search history.

(56) References Cited

U.S. PATENT DOCUMENTS

| | | | | |
|---|---|---|---|---|
| 8,605,724 | B2 * | 12/2013 | Singh | H04L 49/101 370/398 |
| 8,660,118 | B2 * | 2/2014 | Grosser | H04L 45/54 370/392 |
| 9,042,383 | B2 * | 5/2015 | Hendel | H04L 49/358 370/396 |
| 10,153,988 | B2 * | 12/2018 | Sellappa | H04L 45/16 |
| 12,003,429 | B2 * | 6/2024 | Ball | H04L 49/15 |
| 2025/0310244 | A1 * | 10/2025 | Sivaramu | H04L 63/20 |

* cited by examiner

*Primary Examiner* — Elias Mamo
(74) *Attorney, Agent, or Firm* — Lee & Hayes, P.C.

(57) ABSTRACT

Techniques and architecture provide a digital processing unit (DPU) device that includes a first core processor configured to process egress traffic from a host device or application. The DPU device also includes a second core processor configured to process ingress traffic from the ethernet network. The DPU device further includes an interconnected network interface controller (INIC) interface coupled to a first path that includes the first core processor and a second path that includes the second core processor. In configurations, the INIC interface is configured to receive traffic from the first path and traffic from the second path and forward the traffic to an external processor. The INIC interface is also configured to receive traffic from the external processor from the external processor. The INIC interface is further configured to forward the traffic from the external processor to the first path and the second path as needed.

20 Claims, 7 Drawing Sheets

300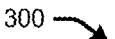

RECEIVE, AT A FIRST PRE-PROCESSOR OF A DIGITAL PROCESSING UNIT (DPU) DEVICE FROM A HOST DEVICE OR APPLICATION, EGRESS TRAFFIC, WHEREIN THE EGRESS TRAFFIC IS DESTINED FOR AN ETHERNET NETWORK

302

FORWARD, BY THE FIRST PRE-PROCESSOR OF THE DPU DEVICE TO AN INTERCONNECTED NETWORK INTERFACE CONTROLLER (INIC) INTERFACE OF THE DPU DEVICE, THE EGRESS TRAFFIC

304

FORWARD, BY THE INIC INTERFACE OF THE DPU DEVICE TO AN EXTERNAL PROCESSOR, THE EGRESS TRAFFIC

306

RECEIVE, AT THE INIC INTERFACE OF THE DPU DEVICE FROM THE EXTERNAL PROCESSOR, PROCESSED EGRESS TRAFFIC, WHEREIN THE PROCESSED EGRESS TRAFFIC IS ASSOCIATED WITH THE EGRESS TRAFFIC

308

FORWARD, BY THE INIC INTERFACE OF THE DPU DEVICE TO THE ETHERNET NETWORK, THE PROCESSED EGRESS TRAFFIC

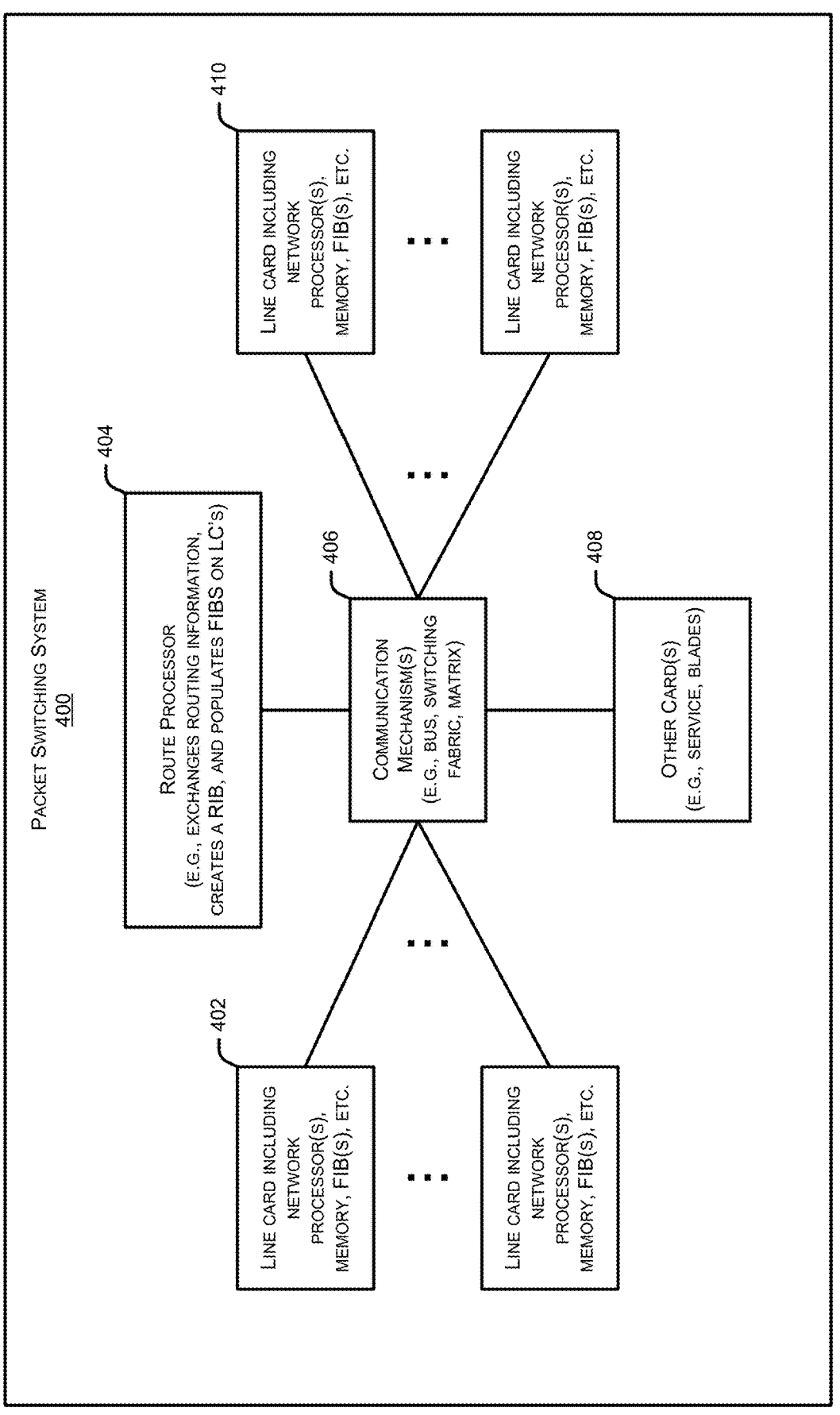

PACKET SWITCHING SYSTEM
400

ROUTE PROCESSOR
(E.G., EXCHANGES ROUTING INFORMATION, CREATES A RIB, AND POPULATES FIBS ON LC'S)
404

LINE CARD INCLUDING NETWORK PROCESSOR(S), MEMORY, FIB(S), ETC.
410

LINE CARD INCLUDING NETWORK PROCESSOR(S), MEMORY, FIB(S), ETC.

COMMUNICATION MECHANISM(S)
(E.G., BUS, SWITCHING FABRIC, MATRIX)
406

OTHER CARD(S)
(E.G., SERVICE, BLADES)
408

LINE CARD INCLUDING NETWORK PROCESSOR(S), MEMORY, FIB(S), ETC.
402

LINE CARD INCLUDING NETWORK PROCESSOR(S), MEMORY, FIB(S), ETC.

FIG. 4

DIGITAL PROCESSING UNIT (DPU) INCLUDING AN INTERCONNECTED NETWORK INTERFACE CONTROLLER (INIC) INTERFACE

TECHNICAL FIELD

The present disclosure relates generally to providing an interconnected network interface controller (INIC) interface in digital processing (DPU) devices.

BACKGROUND

Digital processing unit (DPU) devices often include one or more processors for handling of traffic. In some configurations, the DPU devices interconnect with host devices or applications and an ethernet network. However, sometimes the one or more processors are unable to handle, e.g., process, some of the traffic. Thus, it is necessary to offload such traffic to an external processing device for processing. Once such traffic has been processed by the external processing device, it may also be necessary to forward the traffic back into the DPU device for routing to the host device or application, or to the ethernet network, depending upon the destination of the original traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for routing and processing traffic via a DPU device, e.g., the example DPU device of FIG. 1, in accordance with the techniques and architecture described herein.

FIG. 4 illustrates a block diagram illustrating an example packet switching system that can be utilized to implement various aspects of the technologies disclosed herein.

DESCRIPTION OF EXAMPLE EMBODIMENTS

Overview

Figure 1:
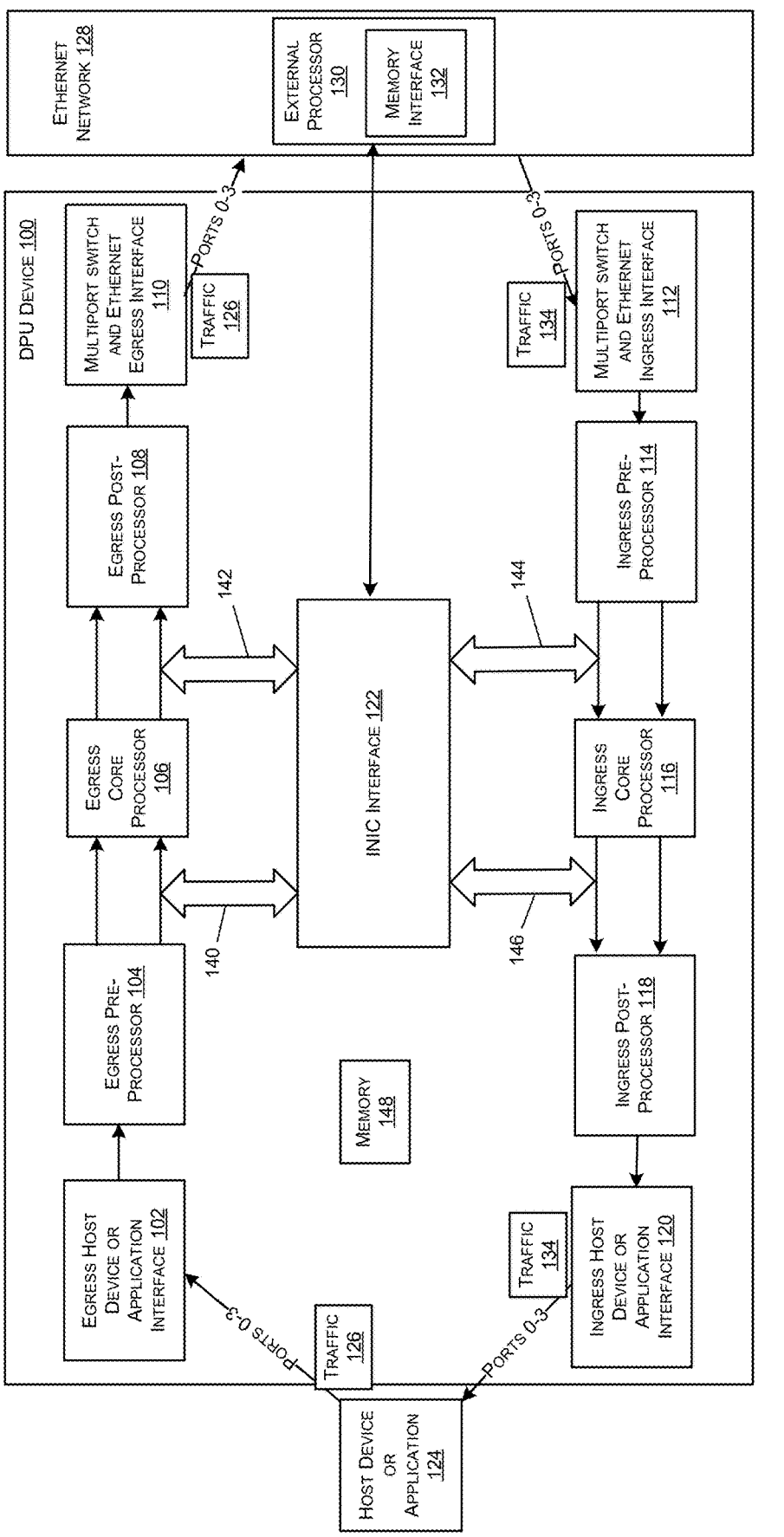
FIG. 1 schematically illustrates an example arrangement that includes at least a portion of a digital processing unit (DPU) device, in accordance with techniques and architecture described herein.

The present disclosure provides techniques and architecture described herein provide for a digital processing unit (DPU) device that includes an interconnected network interface controller (NIC) (INIC) interface. In configurations, the DPU device is in the form of an application-specific integrated circuit (ASIC) and also includes a peripheral component interconnect express (PCIe) host bus interface. In some configurations, the local host peripheral connect bus may be another type of host bus interface, e.g., a universal chiplet interconnect express (UCIe) host bus interface or other type of compute express link (CXL.io) host bus interface.

More particularly, the DPU device includes an egress host device or application interface, an egress pre-processor, an egress core processor, an egress post processor, and a multiport switch and ethernet egress interface. The DPU device may further include a multiport switch and ethernet ingress interface, an ingress pre-processor, an ingress core processor, an ingress post processor, and an ingress host device or application interface. Additionally, as previously noted, the DPU device includes an INIC interface.

In configurations, the DPU device includes four ports. In configurations, the four ports comprise four 100 gigabits per second (Gbps) channels.

As previously noted, the DPU device includes a host device or application egress, e.g., an egress interface. The egress interface is coupled to the four ports to receive traffic from a host device or application. The egress interface provides traffic along all channels of the four ports to the egress pre-processor that may pre-process the traffic before passing the traffic along to the egress core processor. For example, the pre-processor may determine that the traffic cannot be processed by the egress core processor. However, if the traffic can be processed by the egress core processor, the traffic may be forwarded to the egress core processor, which may process the traffic and provide it to the post official egress processor. The post processor may handle the traffic and provide the traffic to the multiport switch and ethernet egress interface for forwarding the processed traffic to the ethernet. Such traffic may be forwarded on non-INIC interface ethernet ports of the DPU device.

If the egress core processor cannot process the traffic, then the pre-processor may provide the traffic to the INIC interface. The INIC interface may then provide the traffic to an external processor. In configurations, the external processor may be in the form of an application-specific integrated circuit (ASIC) or a field-programmable gate array (FPGA).

In configurations, traffic from the ethernet network may arrive at the multiport switch and ethernet ingress interface. Such traffic may arrive on non-INIC interface ethernet ports of the DPU device. The traffic may be forwarded to an ingress pre-processor. The pre-processor may determine whether or not the ingress core processor can handle, e.g., process, the ingress traffic. If the ingress core processor can handle the ingress traffic, then the pre-processor may forward the traffic along non-INIC interface channels of the DPU device to the ingress core processor.

After the ingress core processor processes the traffic, the ingress core processor may forward the processed traffic along non-INIC interface channels of the DPU device. The processed traffic may arrive at an ingress post processor that may forward the processed traffic to an ingress host application interface that may then provide the processed traffic to the host device or application along the ports of the DPU device.

As an example, a digital processing unit (DPU) device may comprise a first core processor configured to process egress traffic from a host device or application, wherein the egress traffic is destined for an ethernet network. The DPU device may also comprise a second core processor configured to process ingress traffic from the ethernet network, wherein the ingress traffic is destined for the host device or application. The DPU device may further comprise an interconnected network interface controller (INIC) interface coupled to (i) a first path that includes the first core processor and (ii) a second path that includes the second core processor. In configurations, the INIC interface may be configured to receive (i) first traffic from the first path and (ii) second traffic from the second path and forward the first traffic and the second traffic to an external processor. The INIC interface may also be configured to receive (i) third traffic from the external processor and (ii) fourth traffic from the external processor, wherein the third traffic is related to the first traffic, and wherein the fourth traffic is related to the second traffic. The INIC interface may be further configured to forward (i) the third traffic to the first path and (ii) the fourth traffic to the second path.

Example Embodiments

In accordance with configurations described herein, as previously noted, techniques and architecture are described herein for providing for a digital processing unit (DPU) device that includes an interconnected network interface controller (NIC) (INIC) interface. In configurations, the DPU device is in the form of an application-specific integrated circuit (ASIC) and also includes a peripheral component interconnect express (PCIe) host bus interface. In some configurations, the local host peripheral connect bus may be another type of host bus interface, e.g., a universal chiplet interconnect express (UCIe) host bus interface or other type of compute express link (CXL.io) host bus interface. In configurations, the DPU device may couple a host device or application to an ethernet network.

As previously noted, in configurations, the DPU device includes an egress host device or application interface, an egress pre-processor, an egress core processor, an egress post processor, and a multiport switch and ethernet egress interface. The DPU device may further include a multiport switch and ethernet ingress interface, an ingress pre-processor, an ingress core processor, an ingress post processor, and an ingress host device or application interface. Additionally, as previously noted, the DPU device includes an INIC interface.

In configurations, the DPU device includes multiple ports. For example, in some configurations, the DPU device includes four ports. In configurations, the four ports comprise four 100 gigabits per second (Gbps) channels. However, the ports may comprise other channels, e.g., N X-Gbps channels.

As previously noted, the DPU device includes a host device or application egress, e.g., an egress interface. In configurations, the egress interface may be coupled to the four ports to receive traffic from a host device or application. The egress interface provides traffic along all channels of the four ports to the egress pre-processor that may pre-process the traffic before passing the traffic along to the egress core processor. For example, the pre-processor may determine that the traffic cannot be processed by the egress core processor. However, if the traffic can be processed by the egress core processor, the traffic may be forwarded to the egress core processor, which may process the traffic and provide it to the post official egress processor. The post processor may handle the traffic and provide the traffic to the multiport switch and ethernet egress interface for forwarding the processed traffic to the ethernet. Such traffic may be forwarded on non-INIC interface ethernet ports of the DPU device.

If the egress core processor cannot process the traffic, then the pre-processor may provide the traffic to the INIC interface. The INIC interface may then provide the traffic to an external processor. In configurations, the external processor may be in the form of an application-specific integrated circuit (ASIC) or a field-programmable gate array (FPGA).

In configurations, traffic from the ethernet network may arrive at the multiport switch and ethernet ingress interface. Such traffic may arrive on non-INIC interface ethernet ports of the DPU device. The traffic may be forwarded to an ingress pre-processor. The pre-processor may determine whether or not the ingress core processor can handle, e.g., process, the ingress traffic. If the ingress core processor can handle the ingress traffic, then the pre-processor may forward the traffic along non-INIC interface channels of the DPU device to the ingress core processor.

After the ingress core processor processes the traffic, the ingress core processor may forward the processed traffic along non-INIC interface channels of the DPU device. The processed traffic may arrive at an ingress post processor that may forward the processed traffic to an ingress host application interface that may then provide the processed traffic to the host device or application along the ports of the DPU device.

In configurations, the external processor may process the ingress and egress traffic tapped at points before or after offload of the traffic and termination, e.g., between the pre-processor and the core processor, or between the core processor and the post-processor. In configurations, the external processor may be used for, for example, any upper layer compression or encryption. For example, the external processor may be used for upper layer compression or encryption before internet protocol security (IPsec) encryption in the DPU device in the DPU device. Also, the external processor may be used for, for example, packet matching or classification or any kind of table lookups in external tables. Additionally, for a packet sent out on the INIC interface, the INIC interface may be used to drop the packet in the external processor, e.g., an external ASIC or FPGA. The processed packet may then be injected back into the DPU device via the INIC interface or elsewhere into a network that includes the DPU device. Additionally, the external processor, e.g., an external ASIC or FPGA, may read or write into a memory of the DPU device via the INIC interface to look-up or edit tables. Additionally, the DPU device may read or write into the external ASIC/FPGA's memory interface via the INIC interface. In configurations, the INIC interface may be used to implement distributed shared memory (DSM)-type distributed memory.

In configurations, the INIC interface may forward traffic on up to two of the four channels connected to the four ports of the DPU device. In configurations, the four channels are one hundred gigabits per second (Gbps) (100G) channels. In configurations, the channel numbers for the INIC interface may be the number two channel and/or the number three channel. The selection may be set by a static configuration register before the start of the flow of traffic.

In configurations, packet filtering (i.e., per packet selection by classification) at the ingress multi-port switch is not possible.

In configurations, the INIC interface consists of a media access control (MAC)-like internal packet frame format, with a start-of-frame and a frame-check-sequence at the end. If a packet error occurs, in configurations, the INIC interface may retransmit the original packet until the peer receives the packet correctly. Alternatively, the INIC interface may attempt to retransmit the original packet to the peer and then stop after a programmed, e.g., predetermined, retry count has been reached.

Accordingly, in configurations, a digital processing unit (DPU) device comprises a first core processor configured to process egress traffic from a host device or application, wherein the egress traffic is destined for an ethernet network. The DPU device also comprises a second core processor configured to process ingress traffic from the ethernet network, wherein the ingress traffic is destined for the host device or application. The DPU device further comprises an interconnected network interface controller (INIC) interface coupled to (i) a first path that includes the first core processor and (ii) a second path that includes the second core processor. In configurations, the INIC interface is configured to receive (i) first traffic from the first path and (ii) second traffic from the second path and forward the first traffic and the second traffic to an external processor. The INIC interface is also configured to receive (i) third traffic from the external processor and (ii) fourth traffic from the external processor, wherein the third traffic is related to the first traffic, and wherein the fourth traffic is related to the second traffic. The INIC interface is further configured to forward (i) the third traffic to the first path and (ii) the fourth traffic to the second path.

In some configurations, the DPU device is configured to read from a memory interface of the external processor and write to the memory interface of the external processor.

In some configurations, the INIC interface is configured with an internal packet frame format including a start-of-frame and a frame-check-sequence.

In additional configurations, based at least in part on a packet error occurrence with respect to a packet, the INIC interface is configured to retransmit the packet until the packet is received at a destination of the packet.

In some configurations, based at least in part on a packet error occurrence with respect to a packet, the INIC interface is configured to retransmit the packet until a predefined retry count is reached.

In additional configurations, the DPU device further comprises memory, wherein the external processor is configured to write to the memory.

In some configurations, the DPU device further comprises a multi-port egress switch comprising four channels and a multi-port ingress switch comprising four channels. In some configurations, the INIC interface is configured to forward and receive traffic over up to two of the four channels of the multi-port egress switch and the INIC interface is configured to forward and receive traffic over up to two of the four channels of the multi-port ingress switch.

In configurations, a system comprises an external processor and a digital processing unit (DPU) device. The DPU comprises a first core processor configured to process egress traffic from a host device or application, wherein the egress traffic is destined for an ethernet network. The DPU device also comprises a second core processor configured to process ingress traffic from the ethernet network, wherein the ingress traffic is destined for the host device or application. The DPU device further comprises an interconnected network interface controller (INIC) interface coupled to (i) a first path that includes the first core processor and (ii) a second path that includes the second core processor. In configurations, the INIC interface is configured to receive (i) first traffic from the first path and (ii) second traffic from the second path and forward the first traffic and the second traffic to an external processor. The INIC interface is also configured to receive (i) third traffic from the external processor and (ii) fourth traffic from the external processor, wherein the third traffic is related to the first traffic, and wherein the fourth traffic is related to the second traffic. The INIC interface is further configured to forward (i) the third traffic to the first path and (ii) the fourth traffic to the second path.

In some configurations, the DPU device further comprises memory, wherein the external processor is configured to write to the memory. In some configurations, the DPU device and external processor are configured to provide a cache or DSM control operation.

In some configurations, the external processor comprises one of an application-specific integrated circuit (ASIC) or field-programmable gate array (FPGA).

In configurations, a method comprises receiving, at a first pre-processor of a digital processing unit (DPU) device from a host device or application, egress traffic, wherein the egress traffic is destined for an ethernet network, forwarding, by the first pre-processor of the DPU device to an interconnected network interface controller (INIC) interface of the DPU device, the egress traffic, forwarding, by the INIC interface of the DPU device to an external processor, the egress traffic, receiving, by the INIC interface of the DPU device from the external processor, processed egress traffic, wherein the processed egress traffic is associated with the egress traffic, and forwarding, by the INIC interface of the DPU device to the ethernet network, the processed egress traffic.

In some configurations, the method also comprises receiving, at a second pre-processor of the DPU device from the ethernet network, ingress traffic, wherein the ingress traffic is destined for the host device or application, forwarding, by the second pre-processor of the DPU device to the INIC interface of the DPU device, the ingress traffic, forwarding, by the INIC interface of the DPU device to the external processor, the ingress traffic, receiving, by the INIC interface of the DPU device from the external processor, processed ingress traffic, wherein the processed ingress traffic is associated with the ingress traffic, and forwarding, by the INIC interface of the DPU device to the host device or application, the processed ingress traffic.

In further configurations, the method also comprises reading, by the INIC interface of the DPU device, from a memory interface of the external processor and writing, by the INIC interface of the DPU device, to the memory interface of the external processor.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example arrangement that includes at least a portion of a digital processing unit (DPU) device 100 that includes an egress host device or application interface 102, an egress pre-processor 104, an egress core processor 106, an egress post-processor 108, and a multiport switch and ethernet egress interface 110. The DPU device 100 may further include a multiport switch and ethernet ingress interface 112, an ingress pre-processor 114, an ingress core processor 116, an ingress post-processor 118, and an ingress host device or application interface 120. In configurations, one or more components of the DPU device 100 may be combined. For example, the multiport switch and ethernet egress interface 110 and the multiport switch and ethernet ingress interface 112 may be a single component. Likewise, the core processors 106, 116, in configurations, may be combined and pre-processors may be combined with another pre-processor and/or a post-processor. Additionally, the egress host device or application interface 102 and the ingress host device or application interface 120 may be a single interface. In configurations, such an interface may be a PCIe interface.

The DPU device 100 includes an interconnected network interface controller (INIC) interface 122. In configurations, the DPU device 100 includes multiple ports. For example, in some configurations, the DPU device 100 includes four ports. In configurations, the four ports comprise four 100 gigabits per second (Gbps) channels. However, the ports may comprise other channels, e.g., N X-Gbps channels.

The egress host device or application interface 102 is coupled to the four ports to receive traffic 126 from a host device or application 124. The egress host device or application interface 102 provides traffic 126 along all channels of the four ports to the egress pre-processor 104 that may pre-process the traffic 126 before passing the traffic 126 along to the egress core processor 106. For example, the pre-processor 104 may determine that the traffic 126 cannot be processed by the egress core processor 106. However, if the traffic 126 can be processed by the egress core processor 106, the traffic 126 may be forwarded to the egress core processor 106, which may process the traffic 126 and provide it to the egress post-processor 108. The egress post-processor 108 may handle the traffic 126 and provide the traffic 126 to the multiport switch and ethernet egress interface 110 for forwarding the processed traffic 126 to an ethernet network 128. Such processed traffic 126 may be forwarded on non-INIC interface ethernet ports of the DPU device 100.

If the egress core processor 106 cannot process the traffic 126, then the egress pre-processor 104 may provide the traffic 126 to the INIC interface 122. The INIC interface 122 may then provide the traffic 126 to an external processor 130. In configurations, the external processor 130 may be in the form of an application-specific integrated circuit (ASIC) or a field-programmable gate array (FPGA). The external processor 130 may include a memory interface 132.

In configurations, traffic 134 from the ethernet network 128 may arrive at the multiport switch and ethernet ingress interface 112. Such traffic 134 may arrive on non-INIC interface ethernet ports of the DPU device 100. The traffic 134 may be forwarded to the ingress pre-processor 114. The ingress pre-processor 114 may determine whether or not the ingress core processor 116 can handle, e.g., process, the ingress traffic 134. If the ingress core processor 116 can handle the ingress traffic 134, then the ingress pre-processor 114 may forward the traffic 134 along non-INIC interface channels of the DPU device 100 to the ingress core processor 116.

After the ingress core processor 116 processes the traffic 134, the ingress core processor 116 may forward the processed traffic 134 along non-INIC interface channels of the DPU device 100. The processed traffic 134 may arrive at the ingress post-processor 118 that may forward the processed traffic 134 to the ingress host application interface 120 that may then provide the processed traffic 134 to the host device or application 124 along the ports of the DPU device 100.

In configurations, the external processor 130 may process the ingress and egress traffic 126, 134 tapped at points before or after offload of the traffic 126, 134 and termination, e.g., between the pre-processors 104, 114 and the core processors 106, 116, or between the core processors 106, 116 and the post-processors 108, 118.

Thus, for example, when one or more packets of the traffic 126 are not able to be processed by the egress core processor 106, at 140 the one or more packets can be provided to the INIC interface 122. In configurations, the INIC interface 122 may encapsulate the one or more packets. The INIC interface 122 may forward the one or more packets along an INIC channel of the channels of the DPU device 100. The one or more packets may be forwarded over such channels to the external processor 130. The external processor 130 may process the one or more packets and then return the processed one or more packets to the INIC interface 122 of the DPU device 100. In configurations, the external processor 130 is part of the ethernet network 128.

The INIC interface 122 may then insert the one or more processed packets back to the INIC channel at 142. The processed one or more packets may be provided to the egress post-processor 108. The processed one or more packets may then be provided to the multi-port switch and ethernet egress interface 110. Additionally, in configurations, packets that have been processed by the egress core processor 106 may be provided to the INIC interface 122 at 142, which may then forward the packets to the external processor 130 for further processing. The external processor 130 may return the packets and the packets may be provided to the INIC pathway at 142 such that the packets are provided to the egress post-processor 108, which may then forward the packets to the multi-port switch and ethernet egress interface 110 for forwarding to the ethernet network 128.

In configurations, one or more packets may be provided to the INIC interface 122 at 140 for processing by the external processor 130 and then inserted at 140. The egress core processor 106 may then further process the one or more packets. The one or more packets may then be provided to the INIC interface 122 at 142 for further processing by the external processor 130 and then inserted at 142.

Additionally, for example, when one or more packets of the traffic 134 are not able to be processed by the ingress core processor 116, at 144 the one or more packets can be provided to the INIC interface 122. In configurations, the INIC interface 122 may encapsulate the one or more packets. The INIC interface 122 may forward the one or more packets along an INIC channel of the channels of the DPU device 100. The one or more packets may be forwarded over such channels to the external processor 130. The external processor 130 may process the one or more packets and then return the processed one or more packets to the INIC interface 122 of the DPU device 100.

The INIC interface 122 may then insert the one or more processed packets back to the INIC channel at 146. The processed one or more packets may be provided to the ingress post-processor 118. The processed one or more packets may then be provided to the host device or application interface 120. Additionally, in configurations, packets that have been processed by the egress core processor 116 may be provided to the INIC interface 122 at 146, which may then forward the packets to the external processor 130 for further processing. The external processor 130 may return the packets and the packets may be provided to the INIC pathway at 146 such that the packets are provided to the ingress post-processor 118, which may then forward the packets to the host device or application interface 120 for forwarding to the host device or application interface 120. The host device or application interface 120 may forward the packets to the host device or application 124.

In configurations, one or more packets may be provided to the INIC interface 122 at 144 for processing by the external processor 130 and then inserted at 144. The ingress core processor 116 may then further process the one or more packets. The one or more packets may then be provided to the INIC interface 122 at 146 for further processing by the external processor 130 and then inserted at 146.

In configurations, traffic 126, 134 may be forwarded and/or inserted at other points in the DPU device 100 as opposed to 140, 142, 144, and/or 146. Additionally, traffic 126, 134 may be forwarded and/or inserted at other points in a network that includes the DPU device 100 as opposed to 140, 142, 144, and/or 146. For example, traffic 126, 134 may be retrieved and/or inserted at points within the ethernet network 128.

In configurations, the external processor 130 may be used for, for example, any upper layer compression or encryption of the traffic 126, 134. For example, the external processor 130 may be used for upper layer compression or encryption before internet protocol security (IPsec) encryption in the DPU device 100. In configurations, the external processor 130 may be used for crypto processing. Also, the external processor 130 may be used for, for example, packet matching or classification or any kind of table lookups in external tables. Additionally, for a packet sent out on the INIC interface 122, the INIC interface 122 may be used to drop the packet in the external processor 130, e.g., an external ASIC or FPGA. The processed packet may then be injected back into the DPU device 100 via the INIC interface 122 or elsewhere into a network that includes the DPU device 100. Additionally, the external processor 130, e.g., an external ASIC or FPGA, may read or write into a memory 148 of the DPU device 100 via the INIC interface 122 to look-up or edit tables. Additionally, the DPU device 100 may read or write into the external ASIC/FPGA's memory interface 132 via the INIC interface 122. In configurations, the INIC interface 122 may be used to implement distributed shared memory (DSM)-type distributed memory.

In configurations, the INIC interface 122 may forward traffic on up to two of the four channels connected to the four ports of the DPU device. In configurations, the four channels are one hundred gigabits per second (Gbps) (100G) channels. In configurations, the channel numbers for the INIC interface 122 may be the number two channel and/or the number three channel. The selection may be set by a static configuration register before the start of the flow of traffic.

In configurations, packet filtering (i.e., per packet selection by classification) at the ingress multi-port switch is not possible.

In configurations, the INIC interface 122 consists of a media access control (MAC)-like internal packet frame format, with a start-of-frame and a frame-check-sequence at the end. If a packet error occurs, in configurations, the INIC interface 122 may retransmit the original packet until the peer receives the packet correctly. Alternatively, the INIC interface 122 may attempt to retransmit the original packet to the peer and then stop after a programmed, e.g., predetermined, retry count has been reached.

In configurations, the egress host device or application interface 102 comprises a peripheral component interconnect express (PCIe) host bus interface. In configurations, the host device or application interface 120 comprises a PCIe host bus interface. In configurations, the egress host device or application interface 102 and the host device or application interface 120 are implemented in the same PCIe host interface.

Figure 2A:
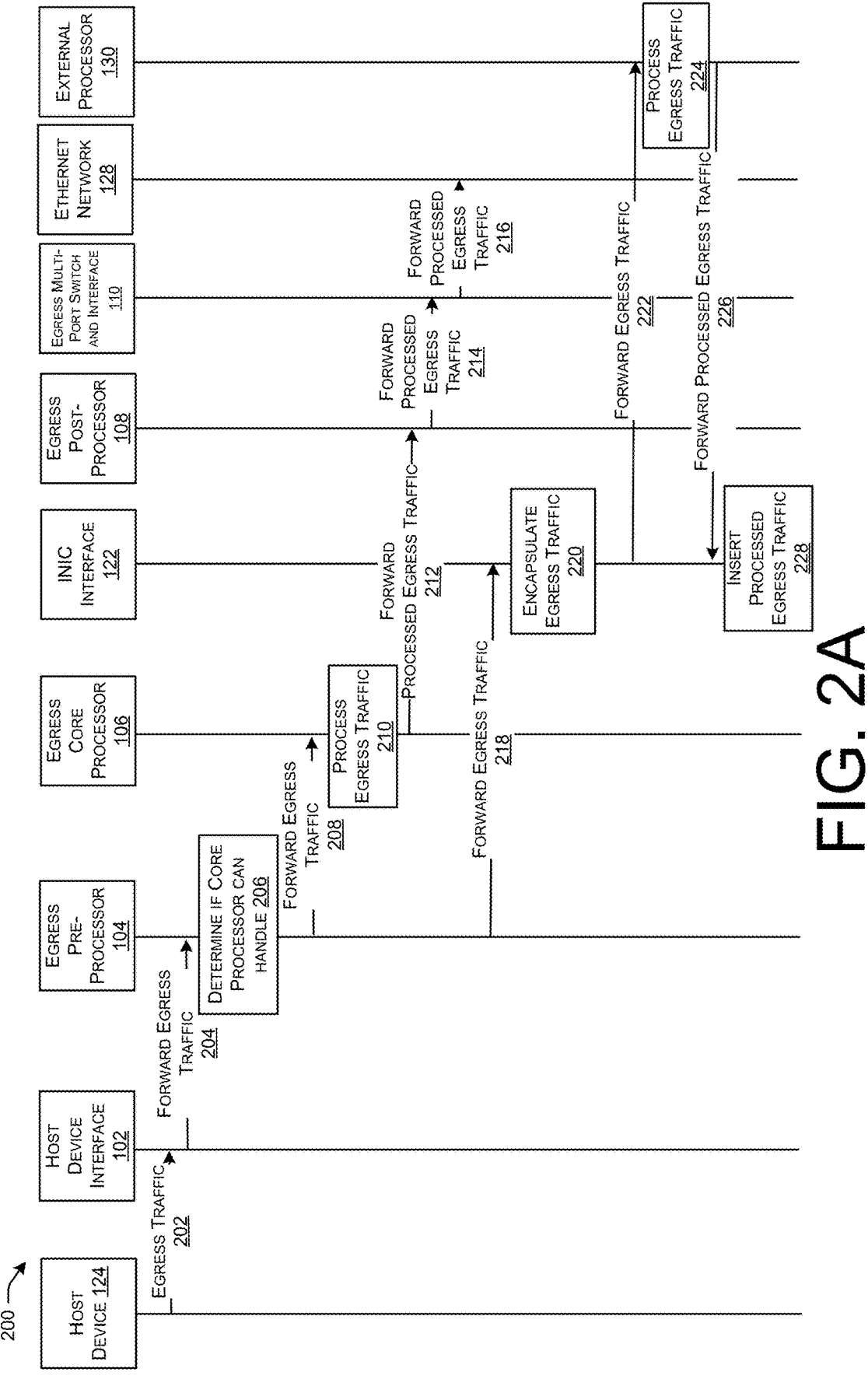
FIGS. 2A and 2B illustrate example flows for forwarding traffic through a DPU device, e.g., the example DPU device of FIG. 1, in accordance with the techniques and architecture described herein.
Figure 2B:
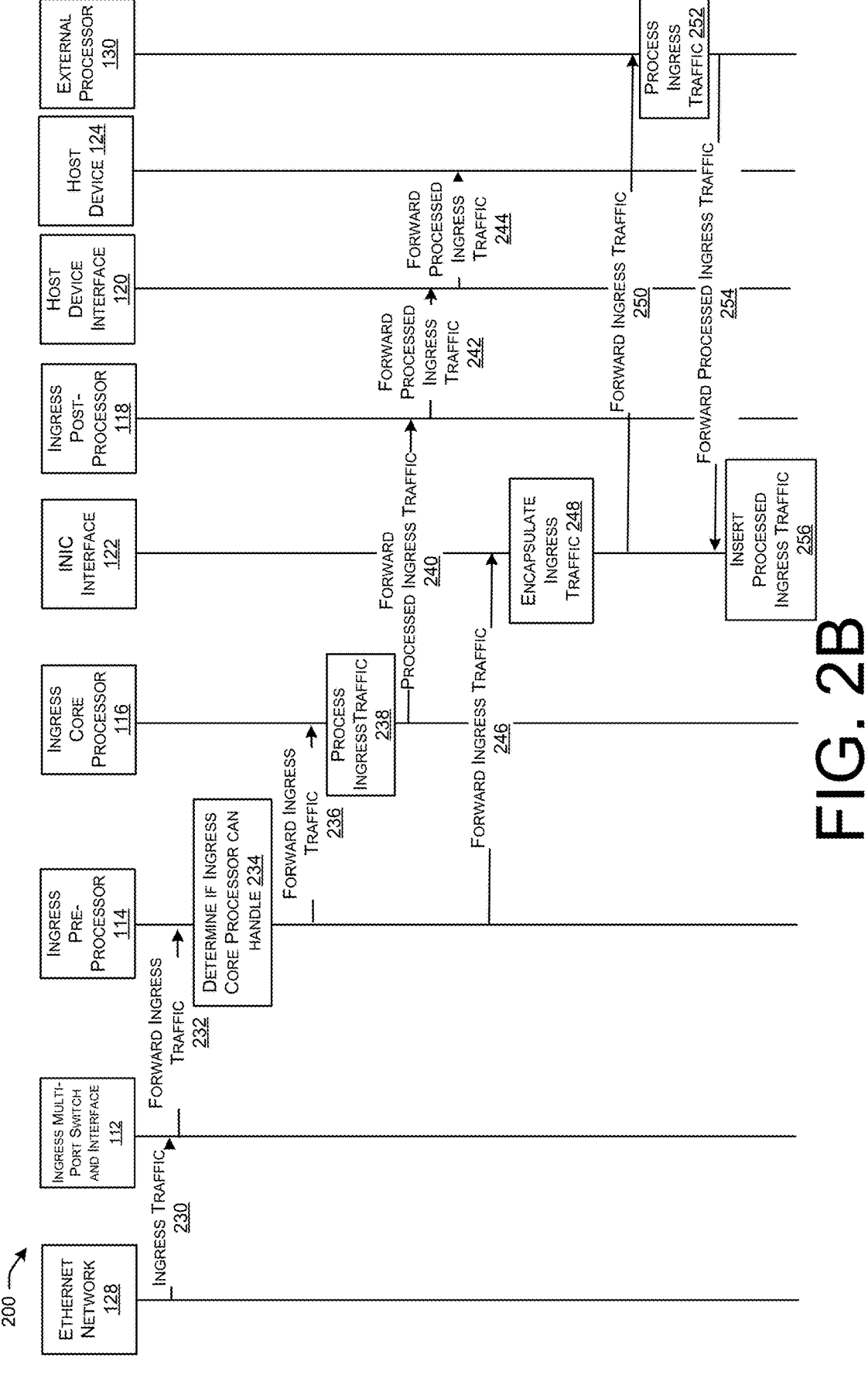

FIGS. 2A and 2B illustrate example flows for forwarding traffic through a DPU device, e.g., the example DPU device 100 of FIG. 1, in accordance with the techniques and architecture described herein. Referring to FIG. 2A, at 202, traffic may be provided from the host device or application 124 to the egress host device or application interface 102. At 204, the traffic may be provided to the egress pre-processor 104. At 206, the egress pre-processor 104 may determine whether or not the egress core processor 106 can process the traffic. If so, then at 208 the egress pre-processor 104 may provide the traffic to the egress core processor 106. At 210, the egress core processor 106 may process the traffic. At 212, the egress core processor 106 may then provide the processed traffic to the egress post-processor 108. At 214, the egress post-processor 108 may provide the processed traffic to the multi-port switch and ethernet egress interface 110. At 216, the multi-port switch and ethernet egress interface 110 may then provide the processed traffic to the ethernet network 128.

If at 206 the egress pre-processor 104 determines that the egress core processor 106 cannot process the traffic, then at 218 the egress pre-processor 104 may provide the traffic to the INIC interface 122. At 220, the INIC interface 122 may encapsulate the traffic. At 222, the INIC interface 122 may then forward the traffic to the external processor 130. At 224, the external processor 130 may process the traffic. At 226, the external processor 130 may then return the traffic to the INIC interface 122. At 228, the INIC interface 122 may then insert the processed traffic back into the path that includes the egress core processor 106. The traffic may be inserted before or after the egress core processor 106. For example, the traffic may be inserted at 140 before the egress core processor 106 and then forwarded to the egress core processor 106, which may perform further processing. The egress core processor 106 may then pass the traffic to the egress post-processor 108, which may perform further processing or may pass the traffic to the egress multi-port switch and ethernet egress interface 110. The egress multi-port switch and ethernet egress interface 110 may provide the traffic to the ethernet network 128. Alternatively, the INIC interface 122 may insert the traffic between the egress core processor 106 and the egress post-processor 108 at 142. The traffic may then be forwarded by the egress post-processor 108 to the egress multi-port switch and ethernet egress interface 110. The multi-port switch and ethernet egress interface 110 may then forward the traffic on to the ethernet network 128.

Referring to FIG. 2B, at 230 traffic may be provided from the ethernet network 128 to the multi-port switch and ethernet ingress interface 112. At 232, the traffic may be provided to the ingress pre-processor 114. At 234, the ingress pre-processor 114 may determine whether or not the egress core processor 116 can process the traffic. If so, then at 236 the ingress pre-processor 114 may provide the traffic to the ingress core processor 116. At 238, the ingress core processor 116 may process the traffic. At 240, the ingress core processor 116 may then provide the processed traffic to the ingress post-processor 118. At 242, the ingress post-processor 118 may provide the processed traffic to the host device or application interface 120. At 244, the host device or application interface 120 may then provide the processed traffic to the host device or application 124.

If at 234 the ingress pre-processor 114 determines that the ingress core processor 116 cannot process the traffic, then at 246 the ingress pre-processor 114 may provide the traffic to the INIC interface 122. At 248, the INIC interface 122 may encapsulate the traffic. At 250, the INIC interface 122 may then forward the traffic to the external processor 130. At 252, the external processor 130 may process the traffic. At 254, the external processor 130 may then return the traffic to the INIC interface 122. At 256, the INIC interface 122 may then insert the processed traffic back into the path that includes the ingress core processor 116. The traffic may be inserted before or after the ingress core processor 116. For example, the traffic may be inserted at 144 before the ingress core processor 116 and then forwarded to the ingress core processor 116, which may perform further processing. The ingress core processor 116 may then pass the traffic to the ingress post-processor 118, which may perform further processing or may pass the traffic to the host device or application interface 120. The host device or application interface 120 may provide the traffic to the host device or application 124. Alternatively, the INIC interface 122 may insert the traffic between the ingress core processor 116 and the ingress post-processor 118 at 146. The traffic may then be forwarded by the ingress post-processor 118 to the host device or application interface 120. The host device or application interface 120 may then forward the traffic on to the host device or application 124.

FIG. 3 illustrates a flow diagram of an example method 300 and illustrates aspects of the functions performed at least partly by devices of a network as described with respect to FIGS. 1, 2A, and 2B. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for forwarding traffic through a DPU device, e.g., the example DPU device 100 of FIG. 1, in accordance with the techniques and architecture described herein. In some examples, the method 300 may be performed by a system comprising one or more processors and one or more non-transitory computer-readable media storing computer-executable instructions that, when executed by the one or more processors, cause the one or more processors to perform the method 300.

At 302, a first pre-processor of a digital processing unit (DPU) device receives, from a host device or application, egress traffic, wherein the egress traffic is destined for an ethernet network. For example, in configurations, the DPU device 100 includes four ports. In configurations, the four ports comprise four 100 gigabits per second (Gbps) channels. The egress host device or application interface 102 is coupled to the four ports to receive traffic 126 from a host device or application 124.

At 304, the first pre-processor of the DPU device forwards, to an interconnected network interface controller (INIC) interface of the DPU device, the egress traffic. For example, the egress host device or application interface 102 provides traffic 126 along all channels of the four ports to the egress pre-processor 104 that may pre-process the traffic 126 before passing the traffic 126 along to the egress core processor 106. For example, the pre-processor 104 may determine that the traffic 126 cannot be processed by the egress core processor 106. However, if the traffic 126 can be processed by the egress core processor 106, the traffic 126 may be forwarded to the egress core processor 106, which may process the traffic 126 and provide it to the egress post-processor 108. The egress post-processor 108 may handle the traffic 126 and provide the traffic 126 to the multiport switch and ethernet egress interface 110 for forwarding the processed traffic 126 to an ethernet network 128. Such processed traffic 126 may be forwarded on non-INIC interface ethernet ports of the DPU device 100. However, if the egress core processor 106 cannot process the traffic 126, then the egress pre-processor 104 may provide the traffic 126 to the INIC interface 122.

At 306, the INIC interface of the DPU device forwards, to an external processor, the egress traffic. For example, the INIC interface 122 may then provide the traffic 126 to an external processor 130. In configurations, the external processor 130 may be in the form of an application-specific integrated circuit (ASIC) or a field-programmable gate array (FPGA).

At 308, the INIC interface of the DPU device receives, from the external processor, processed egress traffic, wherein the processed egress traffic is associated with the egress traffic. For example, the external processor 130 may process the one or more packets and then return the processed one or more packets to the INIC interface 122 of the DPU device 100.

At 310, the INIC interface of the DPU device forwards, to the ethernet network, the processed egress traffic. For example, the INIC interface 122 may then insert the one or more processed packets back to the INIC channel at 142. The processed one or more packets may be provided to the egress post-processor 108. The processed one or more packets may then be provided to the multi-port switch and ethernet egress interface 110. Additionally, in configurations, packets that have been processed by the egress core processor 106 may be provided to the INIC interface 122 at 142, which may then forward the packets to the external processor 130 for further processing. The external processor 130 may return the packets and the packets may be provided to the INIC pathway at 142 such that the packets are provided to the egress post-processor 108, which may then forward the packets to the multi-port switch and ethernet egress interface 110 for forwarding to the ethernet network 128.

FIG. 4 illustrates a block diagram illustrating an example packet switching device (or system) 400 (e.g., appliance, router, switch, etc.) that can be utilized to implement various aspects of the technologies disclosed herein. In some examples, packet switching device(s) 400 may be employed in various networks, such as, for example, a network that includes one or more components of FIG. 1.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements 405 for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
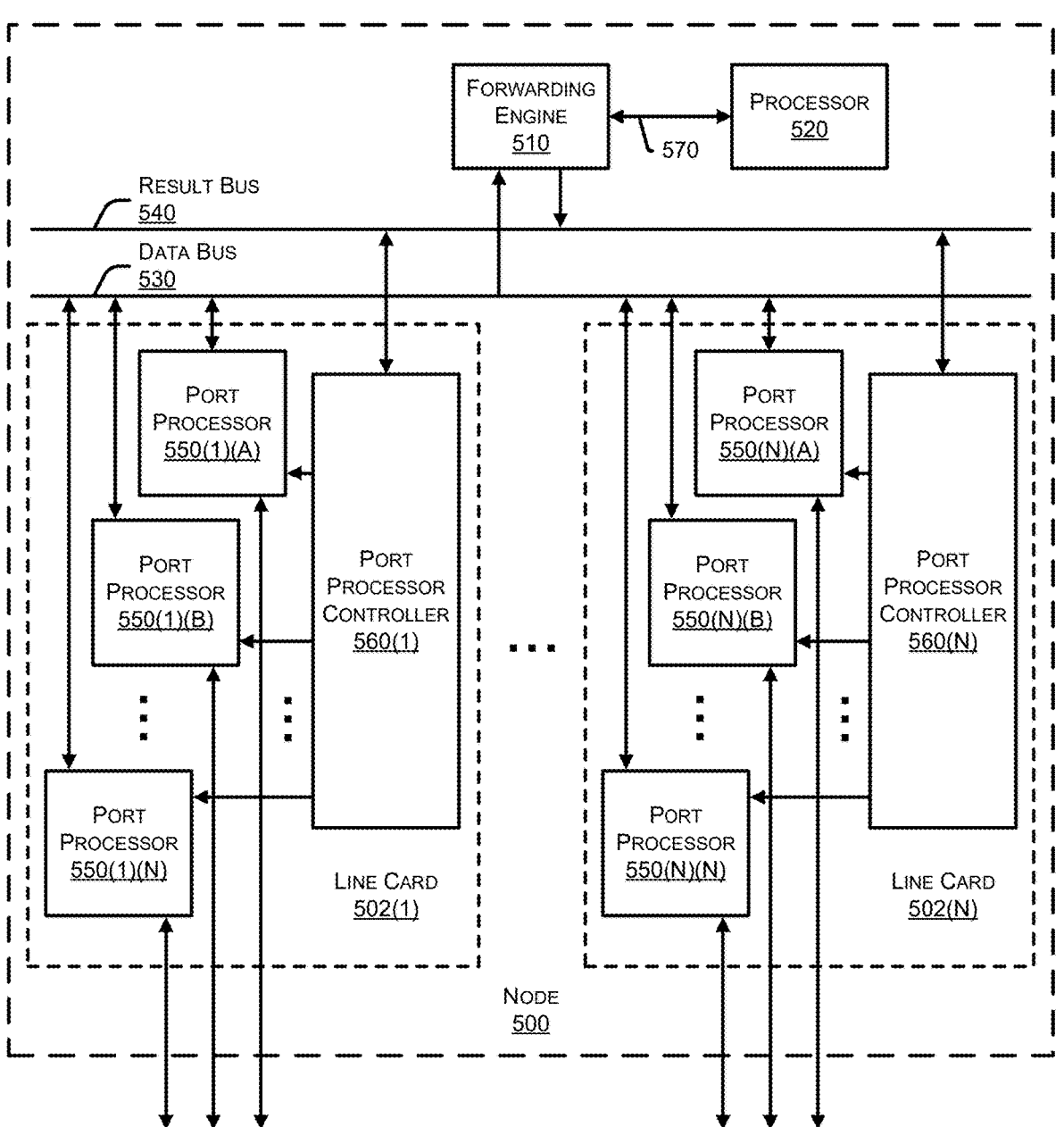
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, a network that includes one or more components of FIG. 1.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or maty add packet security information in order to secure the packet. On a node 500 sourcing such a packet or packet and header, this processing may include, for example, encryption of some or all of the packet's or packet and header's information, the addition of a digital signature, and/or some other information and/or processing capable of securing the packet or packet and header. On a node 500 receiving such a processed packet or packet and header, the corresponding process may be performed to recover or validate the packet's or packet and header's information that has been secured.

Figure 6:
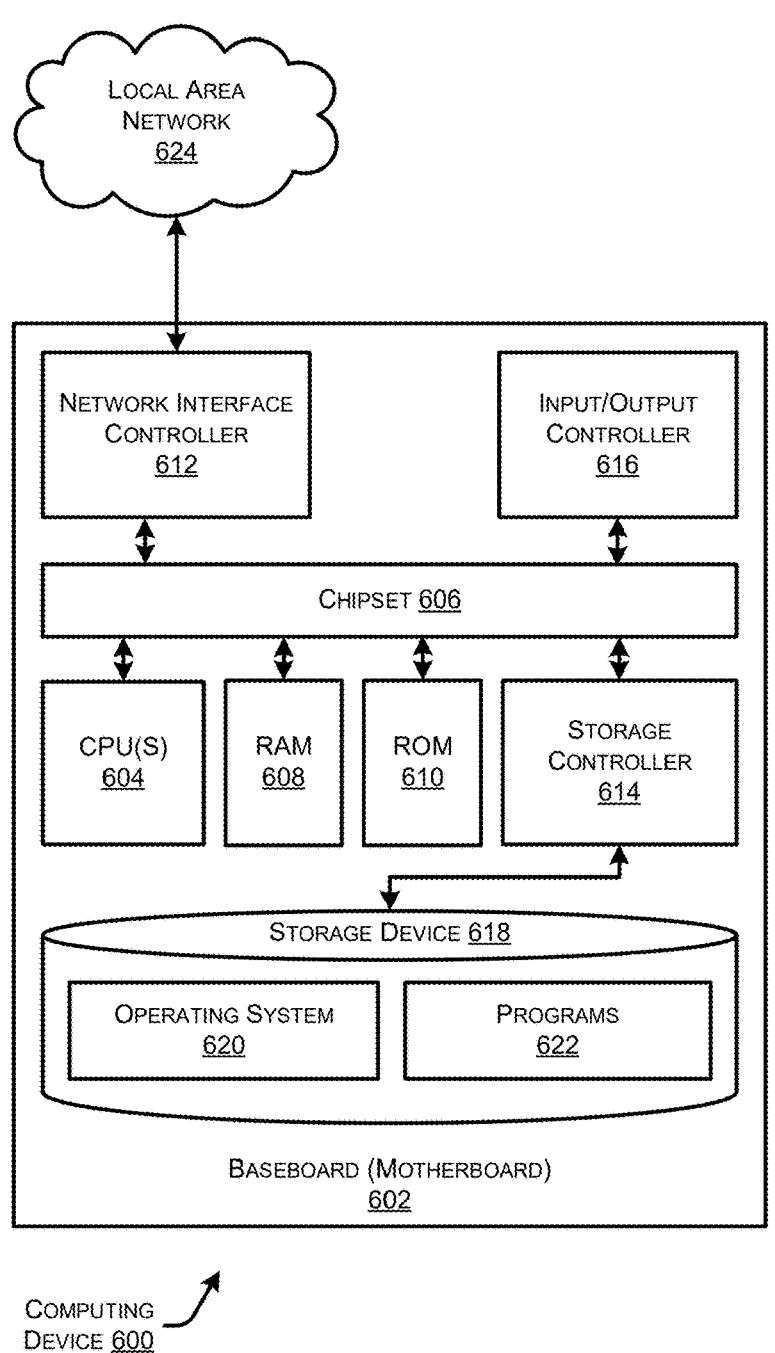
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to one or more components of FIG. 1, the packet switching device 400, and/or the node 500 described herein with respect to FIGS. 1, 4, and 5, respectively.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 624. The chipset 606 can include functionality for providing network connectivity through a NIC 612, such as a gigabit Ethernet adapter. The NIC 612 is capable of connecting the computing device 600 to other computing devices over the network 624. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by a computing resource network, and or any components included therein, may be supported by one or more devices similar to computing device 600. Stated otherwise, some or all of the operations performed by the computing resource network, and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A digital processing unit (DPU) device comprising:
   a first core processor configured to process egress traffic from a host device or application, wherein the egress traffic is destined for an ethernet network;

a second core processor configured to process ingress traffic from the ethernet network, wherein the ingress traffic is destined for the host device or application; and an interconnected network interface controller (INIC) interface coupled to (i) a first path that includes the first core processor and (ii) a second path that includes the second core processor, wherein the INIC interface is configured to:

receive (i) first traffic from the first path and (ii) second traffic from the second path;

forward the first traffic and the second traffic to an external processor;

receive (i) third traffic from the external processor and (ii) fourth traffic from the external processor, wherein the third traffic is related to the first traffic, and wherein the fourth traffic is related to the second traffic; and forward (i) the third traffic to the first path and (ii) the fourth traffic to the second path.

2. The DPU device of claim 1, wherein the DPU device is configured to:

read from a memory interface of the external processor; and write to the memory interface of the external processor.

3. The DPU device of claim 1, wherein the INIC interface is configured with an internal packet frame format including a start-of-frame and a frame-check-sequence.

4. The DPU device of claim 3, wherein based at least in part on a packet error occurrence with respect to a packet, the INIC interface is configured to retransmit the packet until the packet is received at a destination of the packet.

5. The DPU device of claim 3, wherein based at least in part on a packet error occurrence with respect to a packet, the INIC interface is configured to retransmit the packet until a predefined retry count is reached.

6. The DPU device of claim 1, further comprising:

memory, wherein the external processor is configured to write to the memory.

7. The DPU device of claim 1, further comprising:

a multi-port egress switch comprising four channels; and a multi-port ingress switch comprising four channels, wherein the INIC interface is configured to forward and receive traffic over up to two of the four channels of the multi-port egress switch, and wherein the INIC interface is configured to forward and receive traffic over up to two of the four channels of the multi-port ingress switch.

8. A system comprising:

an external processor; and a digital processing unit (DPU) device comprising:

a first core processor configured to process egress traffic from a host device or application, wherein the egress traffic is destined for an ethernet network;

a second core processor configured to process ingress traffic from the ethernet network, wherein the ingress traffic is destined for the host device or application; and an interconnected network interface controller (INIC) interface coupled to (i) a first path that includes the first core processor and (ii) a second path that includes the second core processor, wherein the INIC interface is configured to:

receive (i) first traffic from the first path and (ii) second traffic from the second path;

forward the first traffic and the second traffic to the external processor;

receive (i) third traffic from the external processor and (ii) fourth traffic from the external processor, wherein the third traffic is related to the first traffic, and wherein the fourth traffic is related to the second traffic; and forward (i) the third traffic to the first path and (ii) the fourth traffic to the second path.

9. The system of claim 8, wherein the DPU device is configured to:

read from a memory interface of the external processor; and write to the memory interface of the external processor.

10. The system of claim 8, wherein the INIC interface is configured with an internal packet frame format including a start-of-frame and a frame-check-sequence.

11. The system of claim 10, wherein based at least in part on a packet error occurrence with respect to a packet, the INIC interface is configured to retransmit the packet until the packet is received at a destination of the packet.

12. The system of claim 10, wherein based at least in part on a packet error occurrence with respect to a packet, the INIC interface is configured to retransmit the packet until a predefined retry count is reached.

13. The system of claim 8, wherein the external processor is configured to perform crypto processing of the first traffic and the second traffic.

14. The system of claim 8, wherein the external processor is configured to perform compression of the first traffic and the second traffic.

15. The system of claim 8, wherein the external processor is configured to perform encryption of the first traffic and the second traffic.

16. The system of claim 8, wherein the DPU device further comprises:

memory, wherein the external processor is configured to write to the memory.

17. The system of claim 8, wherein the external processor comprises one of an application-specific integrated circuit (ASIC) or field-programmable gate array (FPGA).

18. A method comprising:

receiving, at a first pre-processor of a digital processing unit (DPU) device from a host device or application, egress traffic, wherein the egress traffic is destined for an ethernet network;

forwarding, by the first pre-processor of the DPU device to an interconnected network interface controller (INIC) interface of the DPU device, the egress traffic;

forwarding, by the INIC interface of the DPU device to an external processor, the egress traffic;

receiving, by the INIC interface of the DPU device from the external processor, processed egress traffic, wherein the processed egress traffic is associated with the egress traffic; and forwarding, by the INIC interface of the DPU device to the ethernet network, the processed egress traffic.

19. The method of claim 18, further comprising:

receiving, at a second pre-processor of the DPU device from the ethernet network, ingress traffic, wherein the ingress traffic is destined for the host device or application;

forwarding, by the second pre-processor of the DPU device to the INIC interface of the DPU device, the ingress traffic;

forwarding, by the INIC interface of the DPU device to the external processor, the ingress traffic;

receiving, by the INIC interface of the DPU device from the external processor, processed ingress traffic, wherein the processed ingress traffic is associated with the ingress traffic; and forwarding, by the INIC interface of the DPU device to the host device or application, the processed ingress traffic.

20. The method of claim 18, further comprising:

reading, by the INIC interface of the DPU device, from a memory interface of the external processor; and writing, by the INIC interface of the DPU device, to the memory interface of the external processor.

\* \* \* \* \*